Aug. 15, 1950     F. M. STEPHENS     2,518,832
PULSATION DAMPENER FOR PRESSURE GAUGES
Filed July 13, 1946
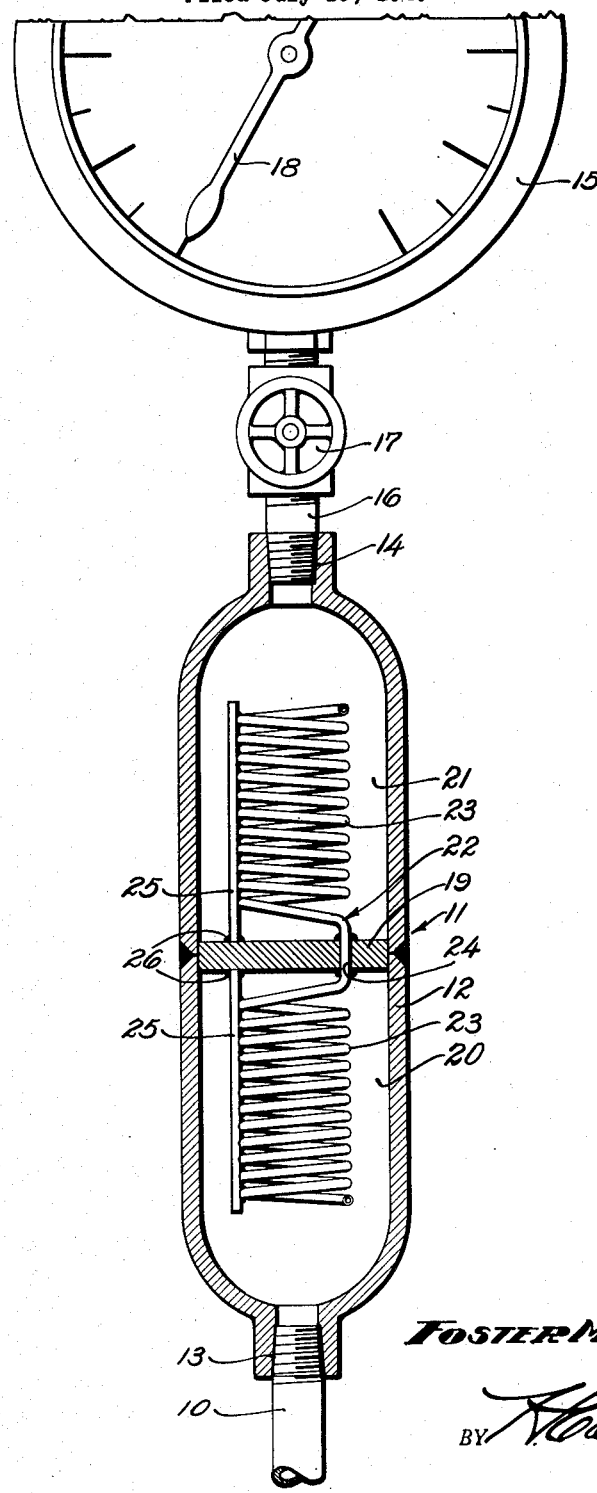
Foster M. Stephens
INVENTOR.
BY
ATTORNEY Patented Aug. 15, 1950

2,518,832

UNITED STATES PATENT OFFICE 2,518,832

PULSATION DAMPENER FOR PRESSURE GAUGES

Foster M. Stephens, Los Angeles, Calif., assignor to The Fluor Corporation, Ltd., Los Angeles, Calif., a corporation of California Application July 13, 1946, Serial No. 683,309

4 Claims. (Cl. 138—26)

1

This invention has for its general object to provide a novel pressure gage attachment for substantially eliminating the transmission to the gage of gas pressure pulsations in a line with which the gage is connected through the present attachment.

Generally speaking, the invention contemplates the provision of an acoustical filter device capable of practical and compact construction rendering it useable in virtually all instances where it may be desirable to stabilize the pressure responsive element or indicator of a pressure gage, and enable such element to assume constantly a position corresponding to the true or base gas line pressure.

Structurally, the filtering device comprises a pair of chambers, preferably contained within a single shell, and having connections for respective communication with a pressure gage and a gas line or other source of pulsating gas pressure. Functionally, the chambers serve as acoustical capacitances in series relation. The chambers are interconnected by restricted acoustical induction type gas passage means, preferably in the form of an extended tube of greater length than the shell and contained in compacted condition within one or both of the chambers, as by a spiral turn or equivalent formation.

Communication of the pressure gage being serially through the chambers and interconnecting inductance passage, the combined acoustical effects and properties of the capacitances and inductance, can be made to virtually eliminate all pulsation transmission to the gage.

The nature of the invention, as well as the details of a typical embodiment thereof, will be more fully understood from the following detailed description of the accompanying drawing which illustrates the device in longitudinal section, with connections to the gage and a pulsating pressure source.

Referring to the drawing, pipe 10 may connect with any source of gas pressure to be indicated by the gage. Typically line 10 may connect with a line conducting the gas at the discharge or suction side of a piston-type compressor operating to produce pulsations in the gas at the fundamental frequency of the compressor. In the case of a single acting compressor, this fundamental frequency will correspond to the compressor R. P. M., and in the case of a double acting compressor, the fundamental frequency will be twice the compressor R. P. M. At this point it may be mentioned that the pulsation filtering device may be designed as later described for the removal of pulsations at the particular frequency (and higher harmonics thereof) of the pulsations transmitted by the gas in line 10, or the filtering device may be designed on the basis of some other or selected frequency which will be inclusive of all pulsations and harmonics thereof, whose elimination is required for stabilization of the gage pressure indicator.

In its preferred form, the pulsation filtering device generally indicated at 11 comprises an elongated shell 12, one end of which is connected at 13 with line 10, with the opposite end of the shell connected at 14 with a pressure indicator or gage 15 through nipple 16 which may contain the usual valve or cock 17. The gage 15 may be of any suitable type for indicating or recording pressures, and is shown typically as the usual dial form having the pressure responsive indicator 18. The shell 12 contains a transverse partition 19 dividing the shell interior into a pair of chambers 20 and 21 which preferably have substantially equal volumes, or common minimum volumes predetermined as hereinafter explained. The shell contains an extended tube 22 forming an induction passage interconnecting the chambers 20, 21, the length of the tube ordinarily being substantially greater than the length of the shell 12. Provision is made for accommodating the relatively longer tube 22, by forming the latter with spiral turns 23 which preferably are contained in both the chambers 20, 21, so that equal lengths of the tubing extend beyond its mid-portion inserted at 24 through the partition 19. The tube coils are suitably held against vibration, as by bonding the coil turns to supports 25 rigidly attached at 26 to the partition.

When normally under the influence of pulsating gas flow in line 10 the gage indicator 18 is in a state of constant change or vibration, with resultant wear and impairment of the working parts of the gage. The presence of the filtering device 11 assures a substantially uniform pressure transmission to the gage, with resultant stabilization of its moving parts.

Best results are obtained by evaluing or predetermining the volume of the chambers 20, 21 and the dimensions of the interconnecting passage in tube 22, with relation to the pulsative condition and properties of the gas communicated to the filter through line 10. The basis for these determinations is the following equation:

$$\frac{L}{R^2} \times V = \frac{C^2}{78.67 F^2}$$

wherein L equals the length and inches of the passage in tube 22; R is the radius in inches of that passage; V is the volume in cubic inches of one of equal volume chambers 20 or 21, or the minimum common or corresponding volume of two such chambers not necessarily of equal volume; C is the velocity in feet per minute of sound in the gas; and F is a selected value for the frequency of the gas pulsations.

The value of C which may be determined from existing tables and corrected if necessary for temperature and pressure conditions of the gas, is the velocity of sound in the gas.

As previously indicated, taking a reciprocating compressor as a typical source of pulsation, it is possible to determine or select a fundamental frequency (F) of the pulsations in accordance with the R. P. M. of the compressor. All harmonics of this frequency naturally will be at a higher frequency than this fundamental. Thus when made for a particular use, the pulsation filter may be designed on the basis of a fundamental frequency which will include all frequencies necessary to be removed for stabilization of the gage; and where an existing filtering device is to be selected for stalizilation of the gage receiving pulsations at determinable frequency, the gage will be selected from the basis of its known pulsation filtering qualities, to include the pulsation range required to be eliminated.

Having determined the value for F it then remains necessary to evaluate the physical dimensions of the chambers 20, 21 and of the interconnecting tube 22. The left-hand side of the equation, i. e.

$$\frac{L}{R^2} \times V$$

defines the volume of each chamber and the length and inside radius of the connecting pipe 22. Accordingly, it is only necessary to determine the value for C in order to have an arithmetic value for the entire right-hand side of the equation. The value for the velocity of sound in the gas is first approximated from existing tables under standard conditions, and is then corrected for pressure and temperature considerations to meet those conditions actually existing in the line 10.

A value for $$\frac{L}{R^2}$$

may arbitrarily be selected to give an induction passage productive of restricted gas flow between the chambers 20, 21. As illustrative, for ordinary pressure gage installations, the tube may have any selected length within a range of about 12 inches to 180 inches, and an inside radius varying from one-eighth inch to one-half inch.

Having thus determined the values for C and $$\frac{L}{R^2}$$

the value of each chamber volume, or V, becomes directly determinable. It will be understood that the determined value for V is a minimum value, and that the chamber volume may be increased beyond that value without impairing performance, although in practice it is desirable to make the chamber of a size close to its calculated volume in order to economize on materials and avoid unnecessarily large equipment. Further with reference to the calculated chamber volume, the value D represents the common or corresponding minimum volume of chambers 20 or 21, less the volume of the contained tube and its support.

The value 78.67 represents essentially a conversion factor predicated upon values for L, R, V, and C according to the English system, as distinguished from the metric system. If the factors be evaluated in terms of the metric system (express L and R as centimeters, V as cubic centimeters, and C as centimeters per second), then the value of pi, or 3.14, is to be used instead of 78.67. It will be understood that the equation expresses the theoretically correct relationship and value, and that in practice it may not be necessary to adhere precisely thereto so long as the relative proportions of the apparatus conform fundamentally and substantially to the equation.

I claim:

1. A device for eliminating gas pulsation transmission to a pressure gage, comprising a shell, a transverse partition dividing the shell into a pair of chambers, one of said chambers being connectible with a pulsating gas line and the other chamber being connectible with a pressure gage, an elongated tube extending through said partition and having spiral turns in both of said chambers, said tube forming an elongated restricted acoustical inductance gas passage interconnecting the chambers, and means stabilizing said turns against vibration.

2. A device for eliminating gas pulsation transmission to a pressure gage, comprising a shell, a transverse partition dividing the shell into a pair of chambers, one of said chambers being connectible with a pulsating gas line and the other chamber being connectible with a pressure gage, an elongated tube extending through said partition and having spiral turns in both of said chambers, said tube forming an elongated restricted acoustical inductance gas passage interconnecting the chambers, and supports attached to said turns and to the partition.

3. A device for eliminating gas pulsation transmission to a pressure gage, comprising means forming a pair of chambers having corresponding minimum volumes as defined in the equation below and adapted to be connected in series with a source of pulsating gas and a pressure gage, and a circular cross-section tube forming an acoustical inductance passage interconnecting said chambers, the volumes of said chambers and the dimensions of said passage having predetermined values substantially in accordance with the following equation:

$$\frac{L}{R^2} \times V = \frac{C^2}{78.67 F^2}$$

wherein

L=Length of said passage in inches,
R=Radius of said passage in inches,
V=Minimum volume of each chamber in cubic inches,
C=Substantially the velocity in feet per minute of sound in the gas, and
F=A selected value for the frequency of the gas pulsations from said source.

4. Apparatus as claimed in claim 3, in which a single shell contains both of said chambers, and said tube extends within and has spiral turns in the chambers.

FOSTER M. STEPHENS.

REFERENCES CITED

The following references are of record in the file of this patent:

UNITED STATES PATENTS

| Number | Name | Date |
| --- | --- | --- |
| 1,622,843 | Price et al. | Mar. 29, 1927 |
| 2,191,990 | Jordan | Feb. 27, 1940 |